(12) United States Patent
Jiang et al.

(10) Patent No.: US 11,666,789 B2
(45) Date of Patent: Jun. 6, 2023

(54) OUTDOOR ENERGY STORAGE SYSTEM CABINET AND OUTDOOR ENERGY STORAGE SYSTEM

(71) Applicant: SUNGROW POWER SUPPLY CO., LTD., Anhui (CN)

(72) Inventors: Ziliang Jiang, Anhui (CN); Guohong Li, Anhui (CN); Zengfu Ding, Anhui (CN); Youjin Yang, Anhui (CN); Yuan Gao, Anhui (CN); Sigen Zheng, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 302 days.

(21) Appl. No.: 16/984,921

(22) Filed: Aug. 4, 2020

(65) Prior Publication Data
US 2021/0060368 A1  Mar. 4, 2021

(30) Foreign Application Priority Data
Aug. 30, 2019 (CN) .......................... 201921442991.3

(51) Int. Cl.
*A62C 3/16* (2006.01)
*A62C 2/04* (2006.01)
(Continued)

(52) U.S. Cl.
CPC .................. *A62C 3/16* (2013.01); *A62C 2/04* (2013.01); *A62C 35/68* (2013.01); *A62C 37/40* (2013.01);
(Continued)

(58) Field of Classification Search
CPC ..... H01M 50/204; H01M 50/673; A26C 3/16; A26C 2/04; A26C 35/68; A26C 37/40
See application file for complete search history.

(56) References Cited

U.S. PATENT DOCUMENTS 6,688,048 B2    2/2004  Staschik
2009/0188682 A1*  7/2009  Gensel .................. A62C 37/50
                                                      169/46
(Continued)

FOREIGN PATENT DOCUMENTS

CN      206964922 U    2/2018
CN      207766726 U    8/2018
(Continued)

OTHER PUBLICATIONS

Second Australian Office Action regarding Application No. 2020101676 dated Mar. 3, 2021.
(Continued)

*Primary Examiner* — Karie O'Neill Apicella
(74) *Attorney, Agent, or Firm* — Harness, Dickey & Pierce, P.L.C.

(57) ABSTRACT

An outdoor energy storage system cabinet and an outdoor energy storage system are provided. The cabinet includes a cabinet body, a water firefighting system, and a gas firefighting system. The water firefighting system includes a water firefighting pipe. The water firefighting pipe is arranged at a top part of an interior of the cabinet body and is provided with a water nozzle. The gas firefighting system includes a gas firefighting pipe. The gas firefighting pipe, like the water firefighting pipe, is arranged on the top part of an interior of the cabinet body. The gas firefighting pipe is configured to contain a firefighting fire extinguishing agent or transport the firefighting fire extinguishing agent. The gas
(Continued)

firefighting pipe is provided with an air nozzle for ejecting firefighting gas generated by the firefighting fire extinguishing agent.

12 Claims, 6 Drawing Sheets

(51) Int. Cl.
  *A62C 37/40* (2006.01)
  *A62C 35/68* (2006.01)
  *H01M 50/204* (2021.01)
  *H01M 50/673* (2021.01)
  *H01M 10/48* (2006.01)
  *H01M 10/42* (2006.01)

(52) U.S. Cl.
  CPC ......... *H01M 10/425* (2013.01); *H01M 10/48* (2013.01); *H01M 10/486* (2013.01); *H01M 50/204* (2021.01); *H01M 50/673* (2021.01); *H01M 2200/00* (2013.01); *H01M 2200/10* (2013.01); *H01M 2220/10* (2013.01)

(56) References Cited

U.S. PATENT DOCUMENTS

| | | | |
|---|---|---|---|
| 2014/0024305 A1 | 1/2014 | Fu | |
| 2018/0342892 A1* | 11/2018 | Zhou | H01L 31/053 |
| 2019/0053400 A1* | 2/2019 | Hendrix | H05K 7/2059 |

FOREIGN PATENT DOCUMENTS

| | | |
|---|---|---|
| CN | 108493807 A | 9/2018 |
| CN | 109617245 A | 4/2019 |
| CN | 109821177 A | 5/2019 |
| JP | 2001157723 A | 6/2001 |
| KR | 101998279 B1 | 7/2019 |
| WO | WO-2004098718 A1 | 11/2004 |

OTHER PUBLICATIONS

Australian Office Action regarding Patent No. 2020101676 dated Oct. 12, 2020.

Extended European Search Report regarding Application No. 20189657.8 dated Jan. 12, 2021.

* cited by examiner

OUTDOOR ENERGY STORAGE SYSTEM CABINET AND OUTDOOR ENERGY STORAGE SYSTEM

CROSS REFERENCE TO RELATED APPLICATIONS

This application claims the priorities to Chinese patent application No. 201921442991.3, titled "OUTDOOR ENERGY STORAGE SYSTEM CABINET AND OUTDOOR ENERGY STORAGE SYSTEM", filed with the China National Intellectual Property Administration on Aug. 30, 2019, the entire disclosure of which is hereby incorporated by reference.

FIELD

The present disclosure relates to the technical field of energy storage systems, and in particular to an outdoor energy storage system cabinet and an outdoor energy storage system.

BACKGROUND

Figure 1:
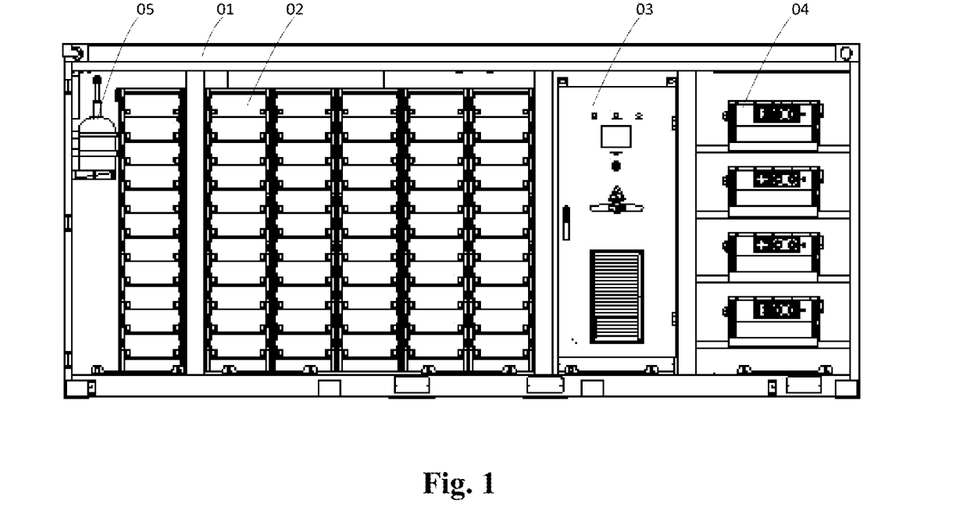
FIG. 1 is a front view of an internal structure of an outdoor energy storage system in the conventional technology.
Figure 2:
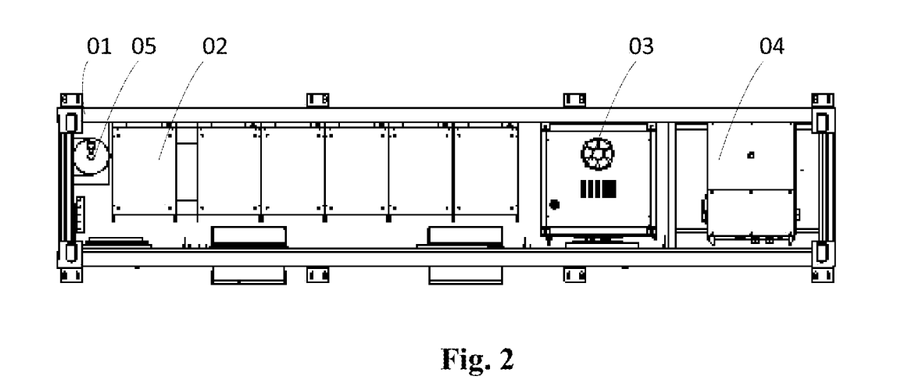
FIG. 2 is a top view of the internal structure of the outdoor energy storage system in the conventional technology.

At present, a firefighting system adopted by an energy storage system consists of a firefighting steel tank and a firefighting main machine. The firefighting host is configured to receive a fire signal and activate a fire alarm apparatus. The firefighting steel tank is configured to store a fire extinguishing agent. As shown in FIGS. 1 and 2, a firefighting steel tank 05 and a firefighting main machine (not shown in the drawings) occupy a large space in an energy storage system cabinet 01. Further, a form of firefighting is simple, is prone to fail and cannot control the fire, resulting in great losses.

SUMMARY

An outdoor energy storage system cabinet is provided, which includes a cabinet body, a water firefighting system, and a gas firefighting system. The water firefighting system includes a water firefighting pipe. The water firefighting pipe is arranged at a top part of an interior of the cabinet body and is provided with a water nozzle. The gas firefighting system includes a gas firefighting pipe. The gas firefighting pipe is arranged at the top part of the interior of the cabinet body and is configured to contain a firefighting fire extinguishing agent or transport the firefighting fire extinguishing agent. The gas firefighting pipe is provided with an air nozzle for ejecting firefighting gas generated by the firefighting fire extinguishing agent.

In an embodiment, the gas nozzle is connected to the gas firefighting pipe via a stop valve. The stop valve is configured to allow the gas nozzle to be in communication with the gas firefighting pipe or not in communication with the gas firefighting pipe. The stop valve is connected to a trigger apparatus. The trigger apparatus is configured to trigger the stop valve to allow the gas nozzle to be in communication with the gas firefighting pipe when a fire occurs in the cabinet body.

In an embodiment, the trigger apparatus includes a controller and at least one of a temperature sensor and a smoke sensor. The controller is configured to control the stop valve to allow the gas nozzle to be in communication with the gas firefighting pipe when the temperature in the cabinet body exceeds a first temperature threshold and/or when the smoke concentration in the cabinet body exceeds a first smoke concentration threshold.

In an embodiment, the outdoor energy storage system cabinet further includes an alarm apparatus connected to the controller. The controller is configured to control the alarm apparatus to alarm when the temperature in the cabinet body exceeds a second temperature threshold and/or when the smoke concentration in the cabinet body exceeds a second smoke concentration threshold. The second temperature threshold is not greater than the first temperature threshold. The second smoke concentration threshold is not greater than the first smoke concentration threshold.

In an embodiment, the trigger apparatus is a manual trigger apparatus including an operation apparatus arranged on an outer wall of the cabinet body. The operation apparatus is connected to the stop valve.

In an embodiment, the outdoor energy storage system cabinet further includes a top-mounted integrated air conditioner. A top of the cabinet body is provided with a mounting groove. The top-mounted integrated air conditioner is embedded in the mounting groove.

In an embodiment, a front side of the cabinet body is provided with a cabinet body air inlet. A rear side of the cabinet body is provided with a cabinet body air outlet. The cabinet body air inlet and the cabinet body air outlet are connected to the mounting groove. An external air inlet of the top-mounted integrated air conditioner is connected to the cabinet body air outlet. An external air outlet of the top-mounted integrated air conditioner is connected to the cabinet body air outlet.

In an embodiment, the mounting groove is provided with a partition plate for partitioning the cabinet body air outlet and the cabinet body air outlet.

In an embodiment, a bottom of the mounting groove is provided with multiple mounting positions for mounting the top-mounted integrated air conditioner. The mounting positions are provided with openings, through which an internal air inlet and an internal air outlet of the top-mounted integrated air conditioner extend into the cabinet body.

An outdoor energy storage system is provided, which includes an energy storage battery cluster, an alternating current and direct current combining cabinet, a string inverter and the outdoor energy storage system cabinet according to any one of the above. The energy storage battery cluster, the alternating current and direct current combining cabinet and the string inverter are arranged in the cabinet body of the outdoor energy storage system cabinet.

It can be seen from the above technical solutions, an outdoor energy storage system cabinet is provided according to the present disclosure. The outdoor energy storage system cabinet includes the cabinet body, the water firefighting system, and the gas firefighting system. The water firefighting system includes the water firefighting pipe. The water firefighting pipe is arranged at the top part of the interior of the cabinet body and is provided with the water nozzle. The water firefighting pipe can directly extend to an outside of the cabinet body for being connected to an on-site water pipe via a switch valve, or for being connected to other water supply apparatus, such as a water pump in a storage tank. The water firefighting system may be controlled automatically or manually. The gas firefighting system includes a gas firefighting pipe. The gas firefighting pipe, like the water firefighting pipe, is arranged at the top part of the interior of the cabinet body. The gas firefighting pipe is configured to contain a firefighting fire extinguishing agent or transport the firefighting fire extinguishing agent. The gas firefighting pipe is provided with an air nozzle for ejecting firefighting gas generated by the firefighting fire extinguishing agent. In use, when a fire occurs in the energy storage system cabinet, the gas firefighting system with less damage to a device is preferentially used. In a case that the gas firefighting system fails, the water firefighting system is activated. It can be seen that the outdoor energy storage system cabinet according to the present disclosure is provided with a spare water firefighting system in additional to the gas firefighting system, so as to ensure the operation of the outdoor energy storage system, improve the safety level of the system, and enhance product competitiveness. Further, since the above two fire firefighting systems are arranged on the top of the cabinet, space in the cabinet can be used reasonably, and mounting positions of components in the cabiner below cannot be crowded.

An outdoor energy storage system is further provided according to an embodiment of the present disclosure. The outdoor energy storage system includes an energy storage battery cluster, an alternating current and direct current combining cabinet, a string inverter and the above outdoor energy storage system cabinet. The energy storage battery cluster, the alternating current and direct current combining cabinet and the string inverter are arranged in the cabinet body of the outdoor energy storage system cabinet. Since the outdoor energy storage system cabinet has the above technical effects, and the outdoor energy storage system includes the above outdoor energy storage system cabinet, the outdoor energy storage system also has the above technical effects.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

In FIG. 1 and FIG. 2:

| 01 | energy storage system cabinet; | 02 | energy storage battery cluster; |
| 03 | alternating current and direct current combining cabinet; | | |
| 04 | string inverter; | 05 | firefighting steel tank. |

In FIG. 3 to FIG. 10:

| 1 | cabinet body; | 2 | alarm apparatus; |
| 3 | energy storage battery cluster; | 4 | top-mounted integrated air conditioner; |
| 5 | water firefighting pipe; | 6 | gas firefighting pipe; |
| 7 | alternating current and direct current combining cabinet; | | |
| 8 | string inverter; | 9 | cabinet body air inlet; |
| 10 | cabinet body air outlet; | 11 | mounting groove; |
| 12 | partition plate; | 13 | opening; |
| 14 | ventilation grille; | 15 | operation apparatus; |

Figure 9:
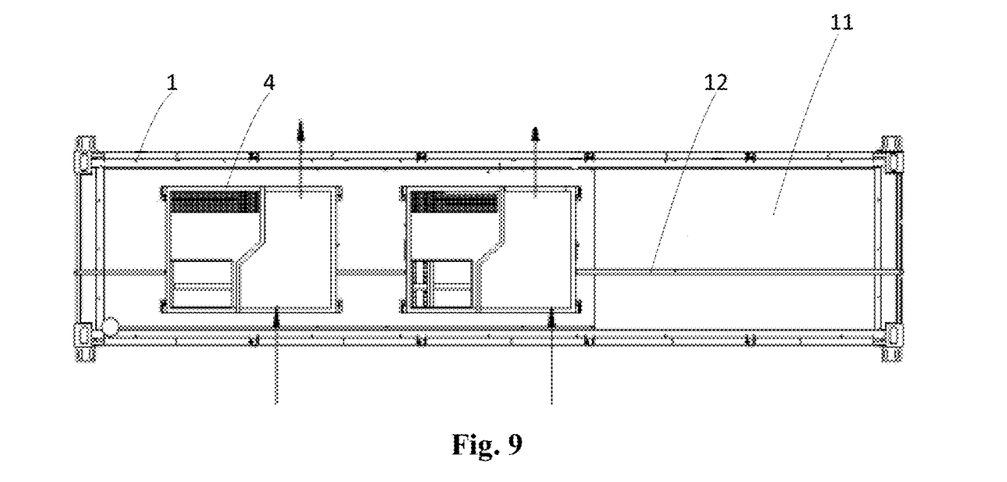
FIG. 9 is a schematic diagram showing inflow and outflow of air outside a top-mounted integrated air conditioner of the outdoor energy storage system cabinet according to an embodiment of the present disclosure.
Figure 10:
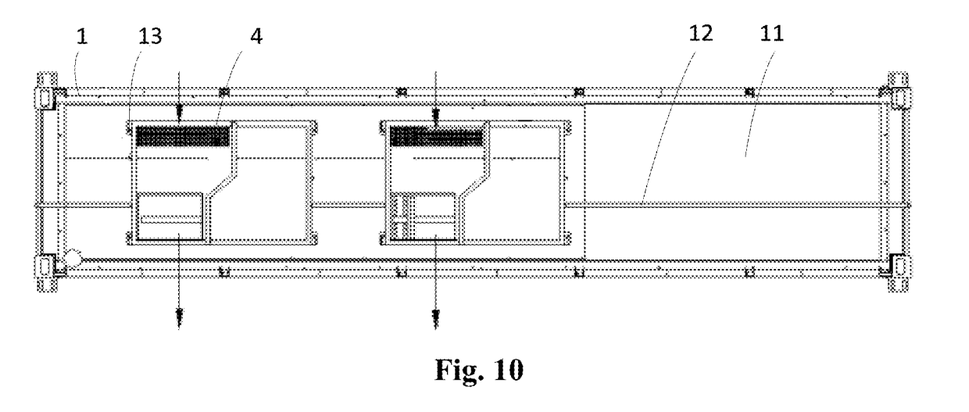
FIG. 10 is a schematic diagram showing inflow and outflow of air inside the top-mounted integrated air conditioner of the outdoor energy storage system cabinet according to the embodiment of the present disclosure.

Arrows in FIGS. 9 and 10 indicate directions of air flow.

DETAILED DESCRIPTION OF EMBODIMENTS

An outdoor energy storage system cabinet is provided, which has a reliable and effective firefighting system, and may ensure stable operation of an energy storage system, improve a safety level of the energy storage system, and reduce space occupied by the firefighting system in the cabinet.

An outdoor energy storage system including the above outdoor energy storage system cabinet is further provided.

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 3:
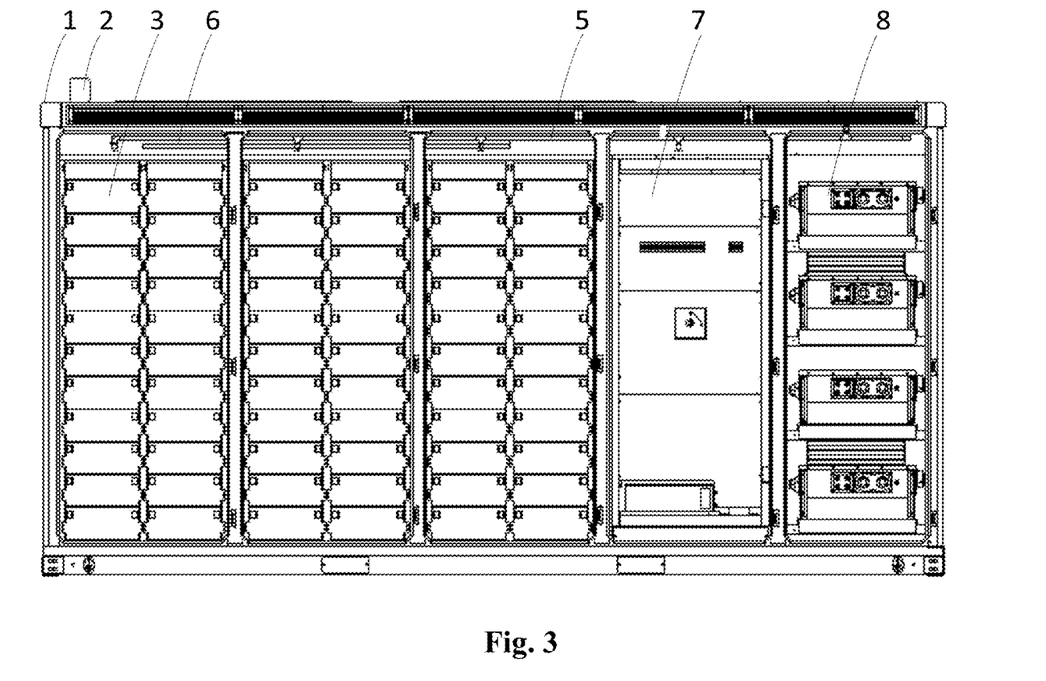
FIG. 3 is a front view of an internal structure of an outdoor energy storage system according to an embodiment of the present disclosure.
Figure 4:
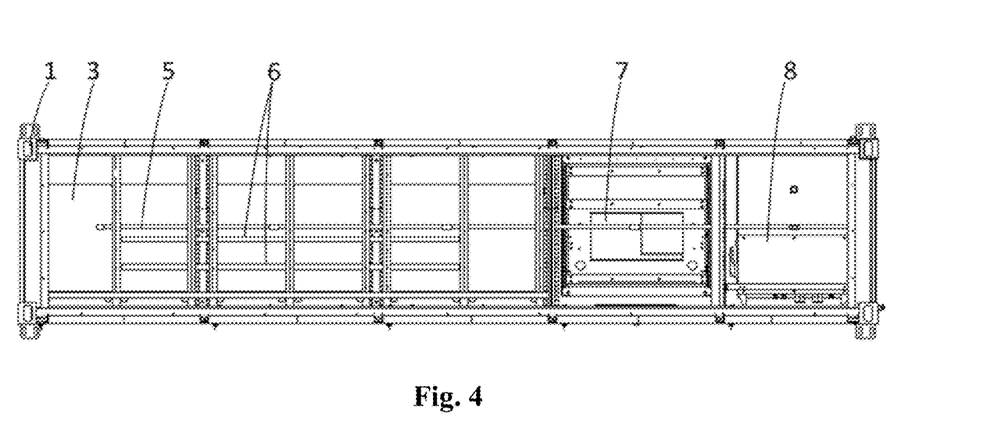
FIG. 4 is a top view of the internal structure of the outdoor energy storage system according to the embodiment of the present disclosure.

Reference is made to FIGS. 3 and 4. FIG. 3 is a front view of an internal structure of an outdoor energy storage system according to an embodiment of the present disclosure. FIG. 4 is a top view of the internal structure of the outdoor energy storage system according to the embodiment of the present disclosure.

An outdoor energy storage system cabinet is provided according to an embodiment of the present disclosure. The outdoor energy storage system cabinet includes a cabinet body 1, a water firefighting system, and a gas firefighting system.

The water firefighting system includes a water firefighting pipe 5. The water firefighting pipe 5 is arranged at a top part of an interior of the cabinet body 1 and is provided with a water nozzle. The water firefighting pipe 5 may directly extend to an outside of the cabinet body 1 for being connected to an on-site water pipe via a switch valve, or being connected to other water supply apparatus, such as a water pump in a storage tank. The water firefighting system may be controlled automatically or manually. The gas firefighting system includes a gas firefighting pipe 6. The gas firefighting pipe 6, like the water firefighting pipe 5, is arranged on the top part of the interior of the cabinet body 1. The gas firefighting pipe 6 is configured to contain a firefighting fire extinguishing agent or transport the firefighting fire extinguishing agent. The gas firefighting pipe 6 is provided with an air nozzle for ejecting firefighting gas generated by the firefighting fire extinguishing agent. Similar to the water firefighting system, the gas firefighting system may be controlled manually or automatically.

It can be seen that, compared with the conventional technology, when the outdoor energy storage system cabinet disclosed in the above embodiments is in use and a fire occurs in the energy storage system cabinet, the gas firefighting system with less damage to a device is preferentially used. In a case that the gas firefighting system fails, the water firefighting system is activated. It can be seen that the outdoor energy storage system cabinet according to the present disclosure is provided with a spare water firefighting system in additional to the gas firefighting system, so as to ensure the operation of the outdoor energy storage system, improve the safety level of the system, and enhance product competitiveness. Further, since the above two fire firefighting systems are arranged at the top part of the cabinet, space in the cabinet can be used reasonably, and mounting positions of components in the cabinet below cannot be crowded.

In an embodiment of the present disclosure, the gas nozzle is connected to the gas firefighting pipe 6 via a stop valve. The stop valve is configured to allow the gas nozzle to be in communication with the gas firefighting pipe 6 or not in communication with the gas firefighting pipe 6. The stop valve is connected to a trigger apparatus. The trigger apparatus is configured to trigger the stop valve to allow the gas nozzle to be in communication with the gas firefighting pipe 6 when a fire occurs in the cabinet body 1. With the trigger apparatus and the stop valve, the gas firefighting system can be controlled more easily.

Further, the gas firefighting system may be controlled in an automatic triggering manner or a manual triggering manner. In an embodiment of the present disclosure, the trigger device includes a controller and at least one of a temperature sensor and a smoke sensor. The temperature sensor and the smoke sensor may be arranged in the gas firefighting pipe 6, or in the water firefighting pipe 5, or at a position of an inner wall of the cabinet body 1 near the top of the cabinet body 1. The controller is configured to control the stop valve to allow the gas nozzle to be in communication with the gas firefighting pipe 6 when temperature in the cabinet body 1 exceeds a first temperature threshold and/or when smoke concentration in the cabinet body 1 exceeds a first smoke concentration threshold. If the gas firefighting system further includes a supply device for supplying a firefighting fire extinguishing agent to the gas firefighting pipe 6, the controller may trigger the supply device while triggering the stop valve.

Components in the outdoor energy storage system may be damaged when starting a firefighting system. Therefore, the firefighting system should be avoided being started as much as possible. Alternatively, the times for starting the firefighting system should be reduced. In view of this, in an embodiment of the present disclosure, the outdoor energy storage system cabinet further includes an alarm apparatus 2 connected to the controller. The controller is configured to control the alarm apparatus 2 to alarm when the temperature in the cabinet body 1 exceeds a second temperature threshold and/or when the smoke concentration in the cabinet body 1 exceeds a second smoke concentration threshold. The second temperature threshold is not greater than the first temperature threshold. The second smoke concentration threshold is not greater than the first smoke concentration threshold. In this way, the alarm apparatus 2 may be started before the gas firefighting system, or the alarm apparatus 2 and the gas firefighting system may be started simultaneously, so as to raise an alarm to remind maintenance personnel to deal with the fire in time.

The alarm apparatus 2 may include but is not limited to a sound-light alarm apparatus 2 and a data transmission apparatus.

Further, in other embodiments, the trigger apparatus is a manual trigger apparatus, which includes an operation apparatus 15 arranged on an outer wall of the cabinet body 1. The operation apparatus 15 is connected to the stop valve. The operation apparatus 15 may be a touch screen or a keyboard arranged on the outer wall of the cabinet body 1.

To further optimize the above technical solutions, the gas firefighting pipe 6 may be provided with multiple gas nozzles. The multiple gas nozzles may be triggered by one trigger apparatus or by different trigger apparatuses. In an automatic trigger manner, multiple temperature sensors and/or smoke sensors corresponding to action areas of the gas nozzles may be arranged in the cabinet. When the temperature sensor and/or smoke sensor in one of the areas detects a temperature over-standard signal or a smoke over-standard signal, the controller controls a stop valve corresponding to a gas nozzle corresponding to the temperature sensor and/or smoke sensor in the area to be switched on, so that the gas firefighting system performs firefighting operation only in the area where the fire occurs, which avoids an impact of the firefighting system on the entire device and reduce lose.

In a manual trigger manner, multiple buttons may be provided. Each button controls one gas nozzle, which achieves independent fire extinguishing operation in different areas of the cabinet and minimizes the impact on the device.

Trigger manners of the gas firefighting system are provided in the above embodiments. Similarly, the water firefighting system may also be controlled in an automatic trigger manner or a manual trigger manner. However, it should be noted that spraying water to the components of the outdoor energy storage system may damage the components. The damaged components cannot be repaired and only be replaced. Therefore, it is best to trigger the water firefighting system in a case that the gas firefighting system fails. Specifically, in a case that the water firefighting system is controlled in the automatic trigger manner, a temperature threshold and a smoke concentration threshold for triggering the water firefighting system should be higher than those for triggering the gas fire firefighting system.

Figure 5:
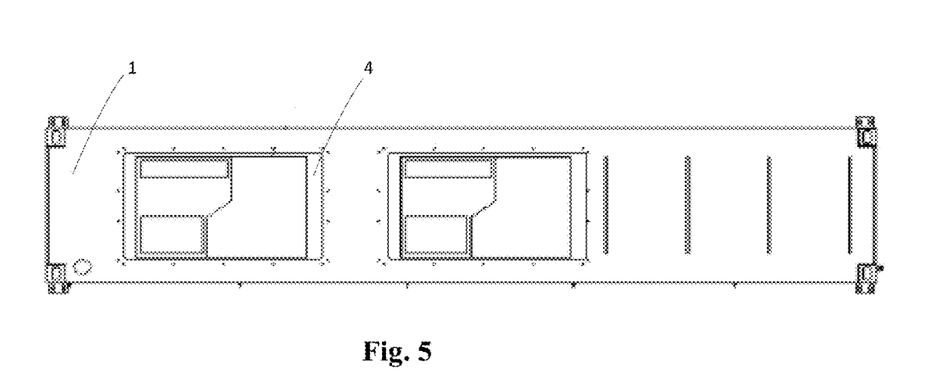
FIG. 5 is a top view of the outdoor energy storage system according to the embodiment of the present disclosure.

An outdoor energy storage system generally includes an energy storage battery cluster 3, an alternating current and direct current combining cabinet 7, and a string inverter 8. The outdoor energy storage system emits large amount of heat during operation. High temperature in the cabinet may affect normal operation of the above device. Therefore, the cabinet must be provided with a temperature control device. In an embodiment of the present disclosure, the outdoor energy storage system cabinet further includes a top-mounted integrated air conditioner 4. As shown in FIGS. 4 and 5, the top of the cabinet body 1 is provided with a mounting groove 11. The top-mounted integrated air conditioner 4 is embedded in the mounting groove 11. By providing the mounting groove 11 on the top of the cabinet body 1, the top-mounted integrated air conditioner 4 can be completely embedded in the mounting groove 11, or a volume of a protrusion of the top-mounted integrated air conditioner 4 can be reduced, so that overall appearance of the cabinet is more tidy and beautiful. Thus, the cabinet is easy to be transported, and the air conditioner is not easy to be damaged during transportation, thereby solving a transportation problem of the existing cabinet. Further, the top-mounted integrated air conditioner 4 has a compact structure and occupies a little space.

Figure 7:
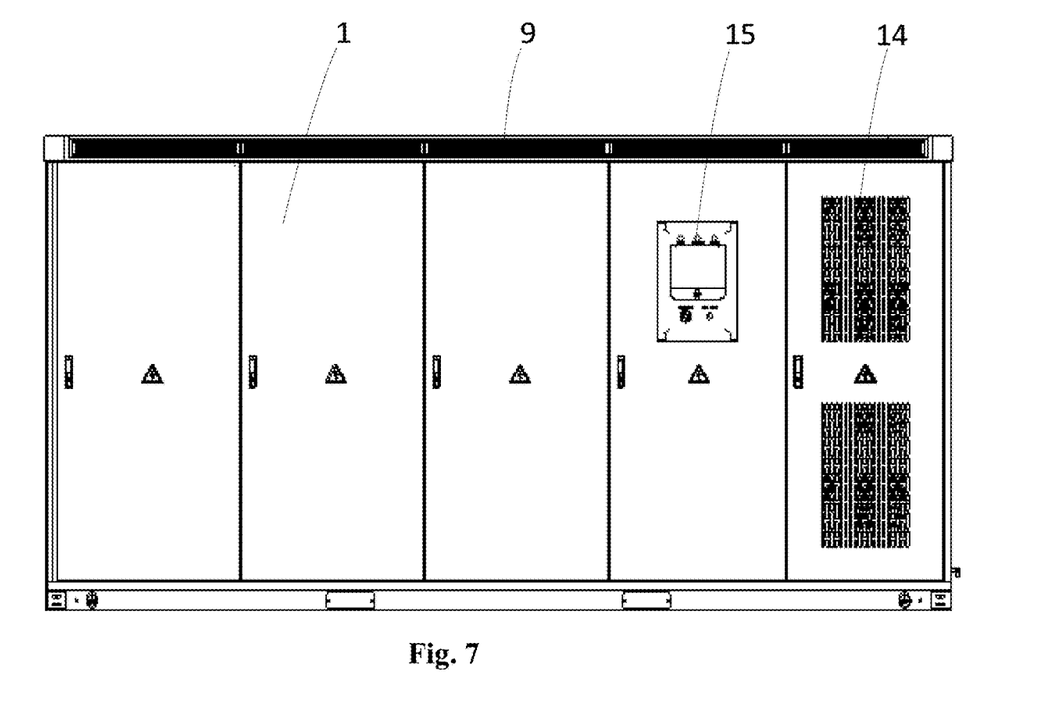
FIG. 7 is a front view of the outdoor energy storage system cabinet according to the embodiment of the present disclosure.
Figure 8:
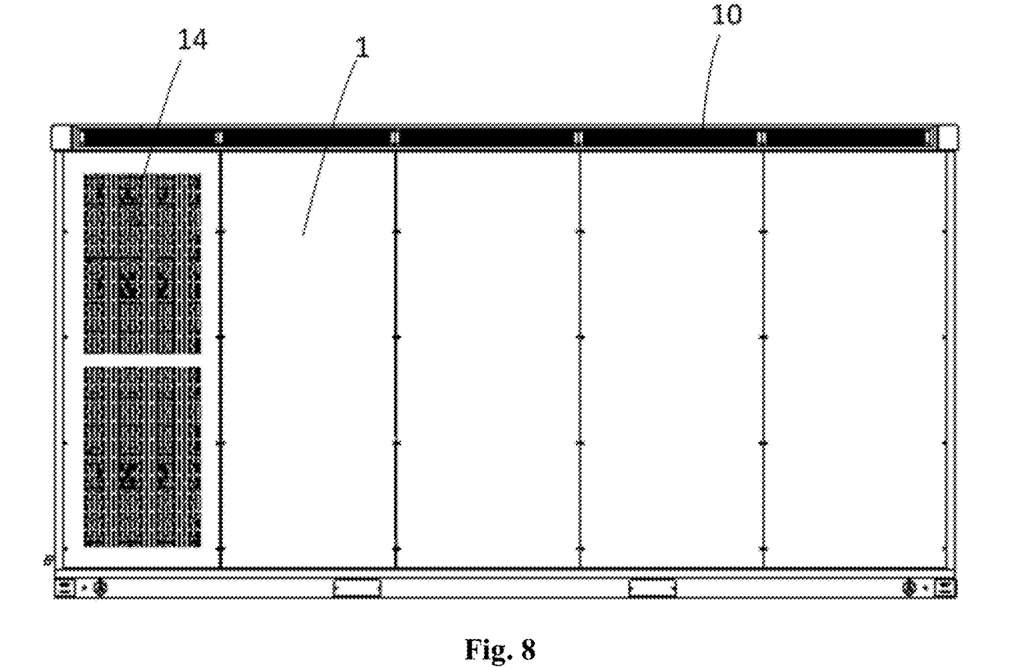
FIG. 8 is a rear view of the outdoor energy storage system cabinet according to the embodiment of the present disclosure.

In an embodiment, as shown in FIGS. 7 and 8, ventilation grilles 14 are arranged at positions of a front outer wall and a rear outer wall of the cabinet corresponding to the string inverter 8.

It should be noted that the number of the mounting grooves 11 may equal to the number of the top-mounted integrated air conditioner 4, that is, one top-mounted integrated air conditioner 4 is mounted in one mounting groove 11. Alternatively, multiple top-mounted integrated air conditioners 4 may be mounted in one mounting groove 11.

Figure 6:
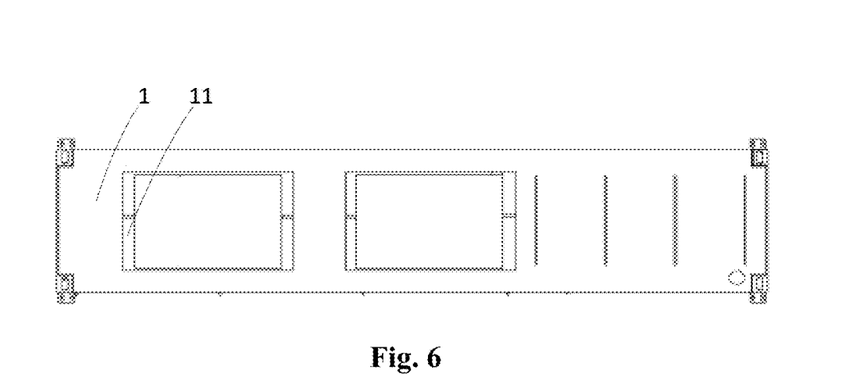
FIG. 6 is a top view of an outdoor energy storage system cabinet according to an embodiment of the present disclosure.

In an embodiment, in order not to affect heat dissipation of an outdoor structure of the top-mounted integrated air conditioner 4 when mounting the top-mounted integrated air conditioner 4, in an embodiment of the present disclosure, a front side of the cabinet body 1 is provided with a cabinet body air inlet 9, and a rear side of the cabinet body 1 is provided with a cabinet body air outlet 10. The cabinet body air inlet 9 and the cabinet body air outlet 10 are connected to the mounting groove 11. An external air inlet of the top-mounted integrated air conditioner 4 is connected to the cabinet body air outlet 10, and an external air outlet of the top-mounted integrated air conditioner 4 is connected to the cabinet body air outlet 10, as shown in FIGS. 6 to 8.

Further, as shown in FIGS. 9 and 10, since the top-mounted integrated air conditioner 4 is embedded, each of the external air inlet and the external air outlet is located in a narrow space. In order to avoid interference between the external air inlet and the external air outlet of the top-mounted integrated air conditioner 4, the mounting groove 11 is provided with a partition plate 12 for partitioning the cabinet body air outlet 10 and the cabinet body air outlet 10. With the partition plate 12, air flowing out from the external air outlet of the top-mounted integrated air conditioner 4 can be prevented from flowing into the external air inlet of the top-mounted integrated air conditioner 4, thereby ensuring cooling efficiency of the top-mounted integrated air conditioner 4.

In an embodiment of the present disclosure, as shown in FIGS. 9 and 10, a bottom of the mounting groove 11 is provided with multiple mounting positions for mounting the top-mounted integrated air conditioner 4. The mounting positions are provided with openings 13 through which an internal air inlet and an internal air outlet of the top-mounted integrated air conditioner 4 extend into the cabinet body 1. The internal air inlet and the internal air outlet of the top-mounted integrated air conditioner 4 are connected to environment inside the cabinet body 1 via the openings 13. An outdoor structure of the top-mounted integrated air conditioner 4 is located in the mounting groove 11. The top-mounted integrated air conditioner 4 is hermetically combined with the openings 13, thereby completely isolating the mounting groove 11 from the inside of the cabinet, so as to achieve waterproofness.

Further, the mounting groove 11 may be provided with a drainage pipe, so that rainwater flowing into the cabinet body via the cabinet body air inlet 9 or the cabinet body air outlet 10 can be drained as soon as possible.

Based on the above outdoor energy storage system cabinet, an outdoor energy storage system is further provided according to an embodiment of the present disclosure. The outdoor energy storage system includes an energy storage battery cluster 3, an alternating current and direct current combining cabinet 7, a string inverter 8 and the outdoor energy storage system cabinet described in the above embodiments. The energy storage battery cluster 3, the alternating current and direct current combining cabinet 7 and the string inverter 8 are arranged in the cabinet body 1 of the outdoor energy storage system cabinet. Since the outdoor energy storage system cabinet has the above technical effects, technical effects of the outdoor energy storage system may refer to the above embodiments.

In an embodiment, since the energy storage battery cluster 3 has a high probability of fire, the water firefighting system and the gas firefighting system are at least arranged above the energy storage battery cluster 3.

The embodiments in this specification are described in a progressive way, each of which emphasizes the differences from others, and the same or similar parts among the embodiments can be referred to each other.

Based on the above description of the disclosed embodiments, those skilled in the art can implement or carry out the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. An outdoor energy storage system cabinet, comprising:
   a cabinet body;
   a water firefighting system having a water firefighting pipe, wherein the water firefighting pipe is arranged at a top part of an interior of the cabinet body and is provided with a water nozzle;
   a gas firefighting system having a gas firefighting pipe, wherein the gas firefighting pipe is arranged at the top part of an interior of the cabinet body and is configured to contain a firefighting fire extinguishing agent or transport the firefighting fire extinguishing agent, and the gas firefighting pipe is provided with an air nozzle for ejecting firefighting gas generated by the firefighting fire extinguishing agent; and
   a top-mounted integrated air conditioner, wherein a top of the cabinet body is provided with a mounting groove, and the top-mounted integrated air conditioner is embedded in the mounting groove,
   wherein a front side of the cabinet body is provided with a cabinet body air inlet, a rear side of the cabinet body is provided with a cabinet body air outlet, the cabinet body air inlet and the cabinet body air outlet are connected to the mounting groove, an external air inlet of the top-mounted integrated air conditioner is connected to the cabinet body air inlet, and an external air outlet of the top-mounted integrated air conditioner is connected to the cabinet body air outlet.

2. The outdoor energy storage system cabinet according to claim 1, wherein the gas nozzle is connected to the gas firefighting pipe via a stop valve, the stop valve is configured to allow the gas nozzle to be in communication with the gas firefighting pipe or not in communication with the gas firefighting pipe, the stop valve is connected to a trigger apparatus, and the trigger apparatus is configured to trigger the stop valve to allow the gas nozzle to be in communication with the gas firefighting pipe when a fire occurs in the cabinet body.

3. The outdoor energy storage system cabinet according to claim 2, wherein the trigger apparatus comprises a controller and at least one of a temperature sensor and a smoke sensor, wherein
- the controller is configured to control the stop valve to connect the gas nozzle to the gas firefighting pipe when temperature in the cabinet body exceeds a first temperature threshold; and/or
- the controller is configured to control the stop valve to connect the gas nozzle to the gas firefighting pipe when smoke concentration in the cabinet body exceeds a first smoke concentration threshold.

4. The outdoor energy storage system cabinet according to claim 3, further comprising an alarm apparatus connected to the controller, wherein
- the controller is configured to control the alarm apparatus to alarm when a temperature in the cabinet body exceeds a second temperature threshold, and the second temperature threshold is not greater than the first temperature threshold; and/or
- the controller is configured to control the alarm apparatus to alarm when a smoke concentration in the cabinet body exceeds a second smoke concentration threshold, and the second smoke concentration threshold is not greater than the first smoke concentration threshold.

5. The outdoor energy storage system cabinet according to claim 2, wherein the trigger apparatus is a manual trigger apparatus comprising an operation apparatus arranged on an outer wall of the cabinet body, and the operation apparatus is connected to the stop valve.

6. The outdoor energy storage system cabinet according to claim 1, wherein the mounting groove is provided with a partition plate for partitioning the cabinet body air inlet and the cabinet body air outlet.

7. The outdoor energy storage system cabinet according to claim 6, wherein a bottom of the mounting groove is provided with a plurality of mounting positions for mounting the top-mounted integrated air conditioner, and the mounting positions are provided with openings throughout which an internal air inlet and an internal air outlet of the top-mounted integrated air conditioner extend into the cabinet body.

8. The outdoor energy storage system cabinet according to claim 2, further comprising a top-mounted integrated air conditioner, a top of the cabinet body is provided with a mounting groove, and the top-mounted integrated air conditioner is embedded in the mounting groove.

9. The outdoor energy storage system cabinet according to claim 3, further comprising a top-mounted integrated air conditioner, a top of the cabinet body is provided with a mounting groove, and the top-mounted integrated air conditioner is embedded in the mounting groove.

10. The outdoor energy storage system cabinet according to claim 4, further comprising a top-mounted integrated air conditioner, a top of the cabinet body is provided with a mounting groove, and the top-mounted integrated air conditioner is embedded in the mounting groove.

11. The outdoor energy storage system cabinet according to claim 5, further comprising a top-mounted integrated air conditioner, a top of the cabinet body is provided with a mounting groove, and the top-mounted integrated air conditioner is embedded in the mounting groove.

12. An outdoor energy storage system, comprising:
- an energy storage battery cluster;
- an alternating current and direct current combining cabinet;
- a string inverter; and
- the outdoor energy storage system cabinet according to claim 1, wherein
- the energy storage battery cluster, the alternating current and direct current combining cabinet and the string inverter are arranged in the cabinet body of the outdoor energy storage system cabinet.

* * * * *